(12) United States Patent
Holtgraver (10) Patent No.: US 8,863,596 B2
(45) Date of Patent: Oct. 21, 2014

(54) FLAT YOKE VALVE ACTUATOR

(76) Inventor: Edward G. Holtgraver, Spring, TX (US)

(*) Notice: Subject to any disclaimer, the term of this patent is extended or adjusted under 35 U.S.C. 154(b) by 0 days.

(21) Appl. No.: 13/340,171

(22) Filed: Dec. 29, 2011

(65) Prior Publication Data

US 2012/0096962 A1    Apr. 26, 2012

Related U.S. Application Data

(63) Continuation of application No. 12/004,605, filed on Dec. 22, 2007, now Pat. No. 8,087,316.

(60) Provisional application No. 60/903,860, filed on Feb. 28, 2007.

(51) Int. Cl.
*F16H 21/18*   (2006.01)
*F16K 31/163*   (2006.01)

(52) U.S. Cl.
CPC .................. *F16K 31/1635* (2013.01)
USPC .................. 74/50; 74/49; 251/229

(58) Field of Classification Search
USPC ............... 74/49, 50; 251/213, 229
See application file for complete search history.

(56) References Cited

U.S. PATENT DOCUMENTS

| | | | | |
|---|---|---|---|---|
| 3,146,681 A * | 9/1964 | Sheesley | ........................ | 92/13.5 |
| 3,253,518 A * | 5/1966 | Evans | ................. | 92/68 |
| 3,298,286 A * | 1/1967 | Tyler | .............................. | 92/140 |
| 3,672,260 A * | 6/1972 | Gachot et al. | ................. | 92/69 R |
| 3,672,262 A * | 6/1972 | Karr | ................. | 92/140 |
| 3,772,966 A * | 11/1973 | Mills | ................. | 92/66 |
| 3,927,573 A * | 12/1975 | Sheesley et al. | ................. | 74/50 |
| 4,013,048 A * | 3/1977 | Reitz | ................. | 123/55.7 |
| 4,970,942 A * | 11/1990 | Sibeud et al. | ................... | 91/519 |

* cited by examiner

*Primary Examiner* — Troy Chambers
*Assistant Examiner* — Emily Cheng
(74) *Attorney, Agent, or Firm* — Bushman Werner, P.C.

(57) ABSTRACT

A Scotch yoke actuator is disclosed with a dual yoke and a diagonally symmetric design. A pair of shafts and pushing devices apply equal, opposing forces to the yoke, causing end loading forces applied to a rotatable shaft attached to the center of the yoke to be cancelled. In embodiments, the weight of the pushing devices is balanced about the yoke, each shaft extends in only one direction from the yoke, and/or the shafts are supported only by the yoke and the pushing devices. In embodiments that use yoke pins, the yoke pins include rollers or bearings to reduce friction, and/or two pair of yoke pin slots support protruding ends of the yoke pins. The yoke pin slots can extend to edges of a yoke housing face, allowing easy shaft removal and reinstallation, and each shaft can include a split end with extensions on opposing sides of the yoke.

6 Claims, 8 Drawing Sheets

(PRIOR ART)

FLAT YOKE VALVE ACTUATOR

CROSS-REFERENCE TO RELATED APPLICATIONS

This application is a continuation of U.S. application Ser. No. 12/004,605, filed Dec. 22, 2007, which is entitled to the benefit of U.S. Provisional patent Application No. 60/903860 entitled "Flat Yoke Valve Actuator," filed Feb. 24, 2007 by Edward George Holtgraver, herein incorporated by reference.

FIELD OF THE INVENTION

The invention generally relates to devices that convert linear motion to rotary motion, and more specifically to Scotch yoke actuators.

BACKGROUND OF THE INVENTION

A common mechanism for converting linear motion to quarter-turn rotary motion is the Scotch yoke actuator. A Scotch yoke actuator provides a rotation of approximately 90 degrees, with a torque that is higher at the ends of travel and lower in the middle. This is beneficial for operating valves that have higher torque requirements at the fully closed position. Also, Scotch yoke actuators are generally less costly to manufacture than other actuator designs when a torque output of greater than 15,000 inch-pounds is required, making the Scotch yoke actuator generally the design of choice for operating large valves.

In a typical Scotch yoke design, a push rod moves back and forth past a rotatable shaft that is offset from the rod and perpendicular to it. The push rod is coupled to the shaft by a lever arm or yoke that converts the linear movement of the rod to a rotary movement of the shaft, with a maximum rotation angle of approximately 90 degrees. The push rod is coupled to the yoke by a yoke pin that passes through a hole in the push rod and a slot in the yoke, thereby allowing the yoke pin to slide along the slot in the yoke as the push rod moves and the yoke and shaft rotate.

A significant disadvantage of the Scotch yoke design is that during most of its 90 degree rotation the force applied by the push rod to the yoke is not perpendicular to the axis of the yoke (the axis of the yoke being defined as an imaginary line that joins the shaft to the yoke pin). This causes "side loading" effects, which are reactionary forces applied perpendicular to the push rod and to the rotatable shaft. The side loading effects must be counteracted so as to prevent the push rod and the rotatable shaft from being moved out of alignment.

In many Scotch yoke designs, push rod support bushings are used to counteract the side loading effect and maintain the orientation of the push rod. But significant side loading force combined with constant sliding of the push rod past the support bushings can cause the bushings to wear and eventually to fail. Also, the side loading force can be transmitted past the support bushings by a lever effect and can damage the piston, spring, or other mechanism that drives the push rod. In addition, the friction between the support bushings and the push rod can cause "jump starts" and uneven movement of the push rod, making the design unsuitable for applications such as valve throttles that require smooth, controllable movement.

In some Scotch yoke actuators, instead of using push rod support bearings, the yoke pin extends beyond the yoke and is supported on either side by slots in a housing that surrounds the yoke, thereby counteracting the side loading effect on the push rod. This approach avoids the wear, unsmooth movement, and other problems associated with push rod support bushings, but does not eliminate side loading of the rotatable shaft, which can cause wearing and failing of the bushings or other structures that support the shaft.

Scotch yoke actuators require that the yoke pin remain parallel to the axis of the rotatable shaft. In the traditional design, a split yoke surrounds the push rod, with the yoke pin passing through the push rod in the middle and yoke slots on either side. In this design, the hole through the push rod is responsible for holding the yoke pin in proper alignment with the rotating axis. Any tendency of the push rod to rotate can cause misalignment of the pin, and even failure of the coupling. Even if slots in a yoke housing are used to maintain the orientation of the yoke pin, rotational tendencies of the push rod can cause wear to the yoke pin and to the yoke pin hole.

SUMMARY OF THE INVENTION

A Scotch yoke actuator is disclosed that includes a dual yoke with a center and two ends. The two ends are symmetric about the center and each end is penetrated by a yoke slot. A rotatable shaft is fixed to the center of the dual yoke and oriented perpendicular to a plane that contains the yoke slots, and a pair of pushing shafts is coupled respectively to the two ends of the dual yoke. A pair of pushing devices is able respectively to apply equal and opposing forces to the two pushing shafts, thereby applying equal and opposing forces respectively to the two ends of the dual yoke, causing end loading forces applied to the rotatable shaft to be cancelled and eliminated. In preferred embodiments, the center of mass of the two pushing devices is located at the center of the dual yoke, causing the weight of the two pushing devices to be balanced about the center of the dual yoke.

In preferred embodiments, the pushing shafts are oriented parallel to each other and perpendicular to the rotation shaft. In other preferred embodiments, each pushing shaft extends only in one direction from the dual yoke, the two pushing shafts extending from the dual yoke in opposite directions. With this design, pushing devices can be located in diagonally symmetric positions on either side of the dual yoke without interference from the pushing shafts.

In preferred embodiments, the pushing shafts are coupled to the ends of the dual yoke by yoke pins that extend through the yoke slots and through holes in the pushing shafts. In some of these preferred embodiments, the yoke pins include rollers, bearings, and/or other mechanisms that are able to reduce friction between a yoke pin and a yoke slot. In other of these preferred embodiments, two pair of yoke pin slots support and guide protruding ends of the two yoke pins as the rotatable shaft rotates. In some of these embodiments, the yoke pin slots are formed in faces of a housing that surrounds the dual yoke, and in some of these embodiments at least one end of each yoke pin slot extends to an edge of the housing face in which it is formed, thereby allowing for easy removal and reinstallation of the pushing shafts and yoke pins without complete disassembly of the dual yoke housing or removal of the dual yoke from the rotatable shaft.

In some preferred embodiments, each pushing shaft is supported only by attachment to the yoke near one end of the shaft and to a pushing device near the other end of the shaft. In other preferred embodiments, each pushing shaft includes a split end or clevis with shaft end extensions that can be located on opposing sides of a yoke slot and coupled to the dual yoke by a yoke pin that passes through the yoke slot and through holes in both of the shaft end extensions.

DETAILED DESCRIPTION OF PREFERRED EMBODIMENTS

Figure 1A:
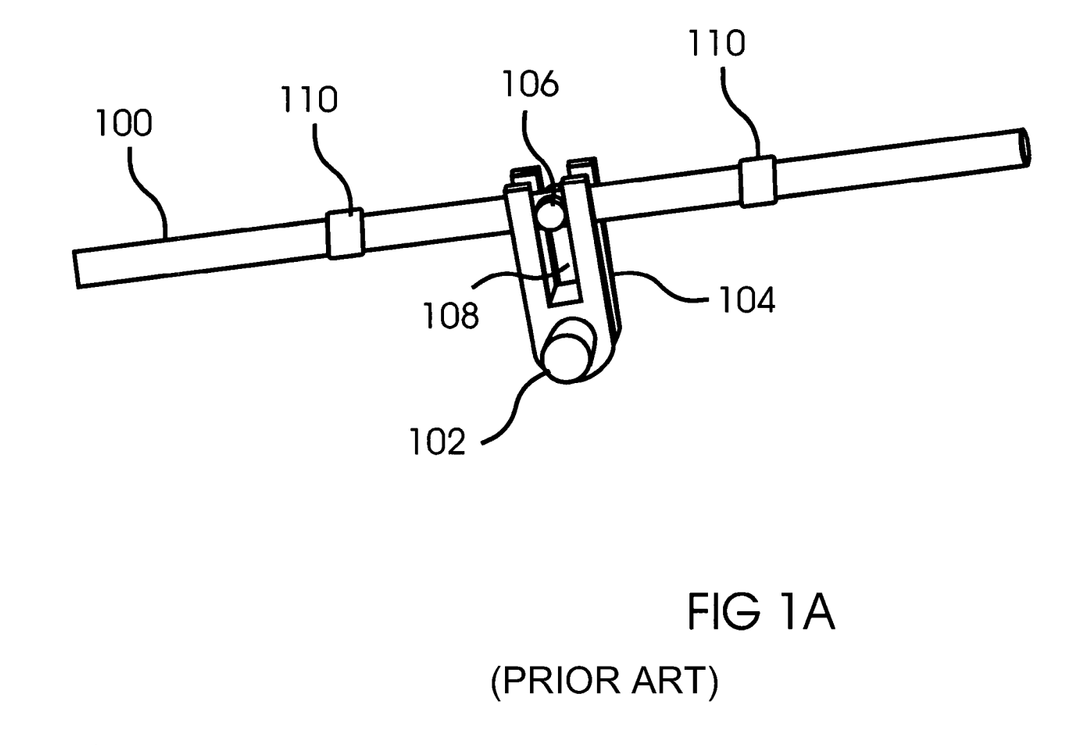
FIG. 1A illustrates the basic features of a traditional Scotch yoke actuator.

With reference to FIG. 1A, in a typical Scotch yoke design a push rod 100 moves back and forth past a rotatable shaft 102 that is offset from the rod and perpendicular to it. The push rod 100 is coupled to the shaft by a lever arm or yoke 104 that converts the linear movement of the rod 100 to a rotary movement of the shaft 102, with a normal rotation angle of approximately 90 degrees. The push rod is coupled to the yoke by a yoke pin 106 that passes through a hole in the push rod and a slot 108 in the yoke 104, thereby allowing the yoke pin 106 to slide along the slot 108 as the push rod 100 moves and the yoke 104 and shaft 102 rotate. Two push rod support bushings 110 resist the side loading forces applied to the push rod 100 and maintain the orientation of the push rod 100.

Figure 1B:
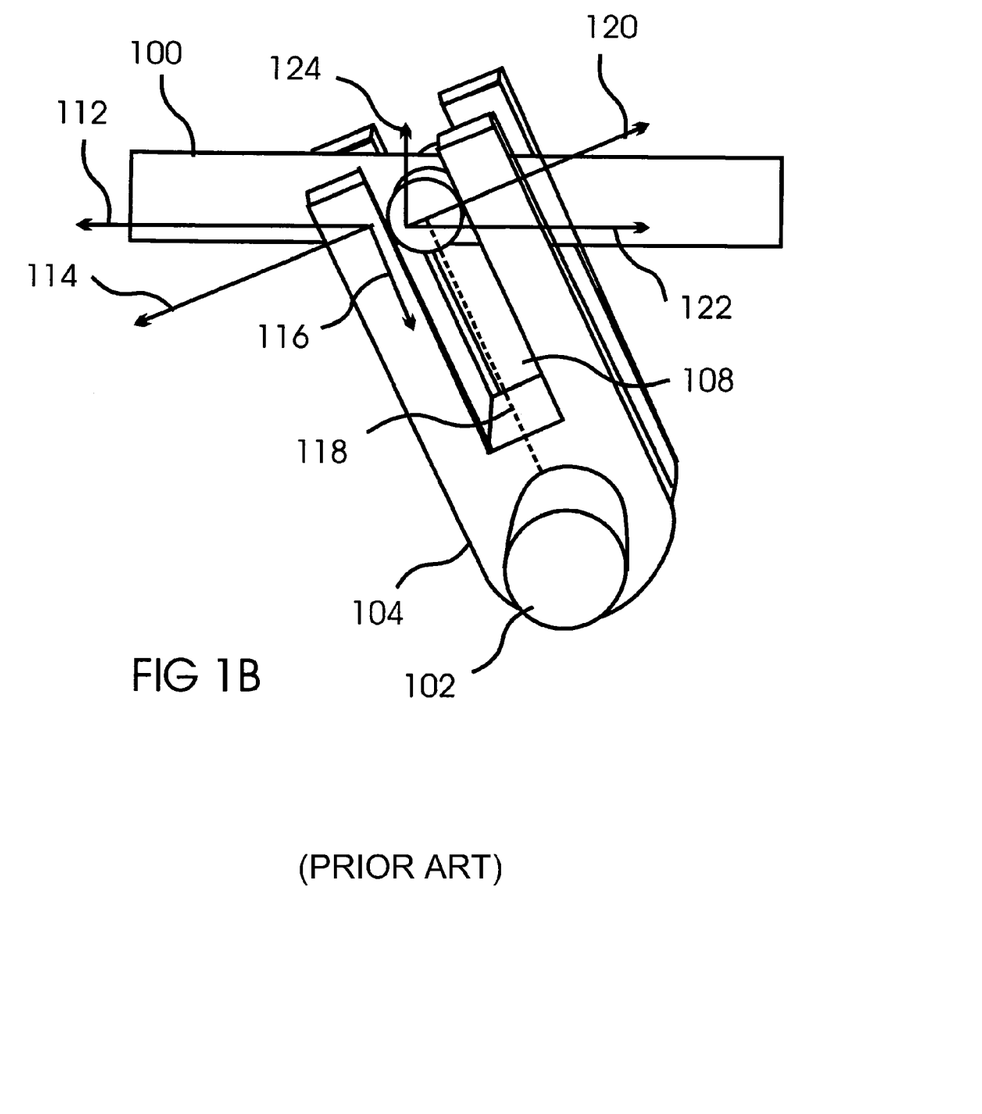
FIG. 1B is a close-up illustration of the yoke portion of FIG. 1A, and illustrates the forces applied to the yoke and the resulting end loading forces applied to the push rod and the rotatable shaft.

FIG. 1B illustrates the forces that are applied by the push rod 100 to the yoke 104, and the reactive forces applied by the yoke 104 to the push rod 100. The push rod 100 applies a force 112 to the yoke 104 that points in the direction of motion of the push rod 100. This force 112 can be decomposed into two components 114, 116. One component 114 is normal to the yoke axis and produces rotational torque about the rotation shaft 102. The other component 116 is parallel to the yoke axis 118 and applies a side loading force tending to push the rotatable shaft 102 out of alignment.

The yoke 104 necessarily responds with a reactive force 120 in a direction perpendicular to the yoke axis. This reactive force 120 can be decomposed into a component 122 in the direction of motion of the push rod 100 and a component 124 perpendicular to the direction of motion of the push rod that acts as a side loading force tending to move the push rod 100 out of alignment. This push rod side loading force 124 must be offset by the push rod support bushings (110 in FIG. 1A), and the rotation shaft side loading force 116 must be offset by similar structures that support the rotatable shaft. In both cases, added friction, wear, and eventual misalignment and failure can occur due to the side loading forces 116, 124.

Figure 2:
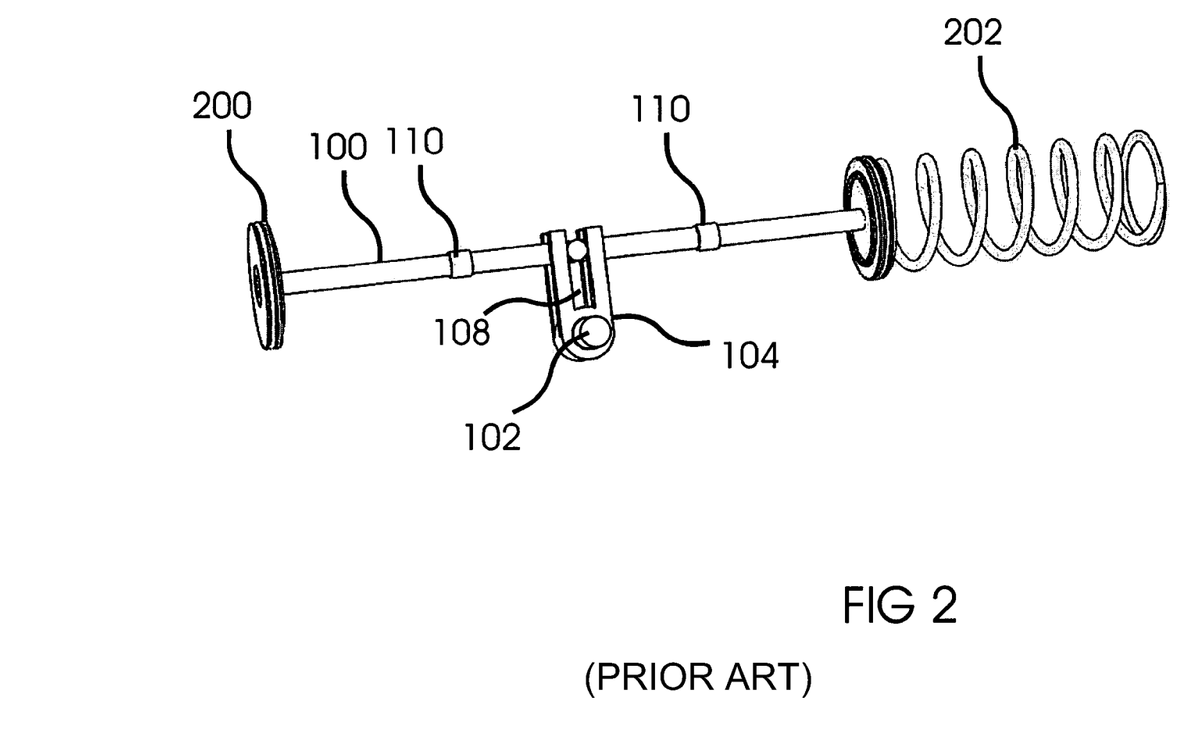
FIG. 2 is a more complete illustration of a traditional Scotch yoke actuator, including a piston at one end of the push rod and a spring at the other end of the push rod.

FIG. 2 illustrates a typical arrangement of pushing devices for a Scotch yoke actuator. A piston 200 pushes on the push rod 100 during a clockwise rotation of the rotatable shaft 102, and a return spring 202 pushes on the push rod 100 during a counterclockwise rotation of the rotation shaft 102.

Figure 3:
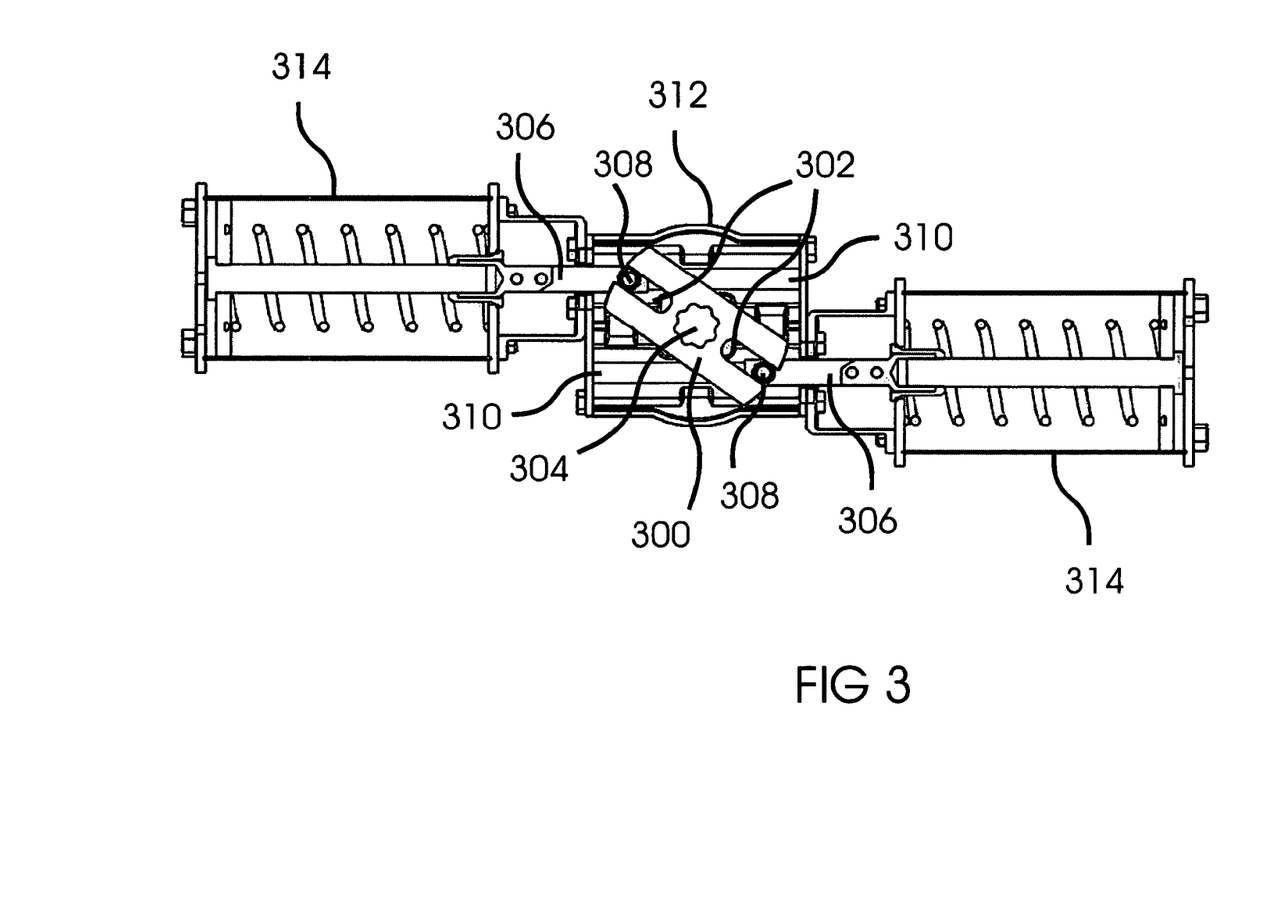
FIG. 3 is a side cutaway view of the present invention.

FIG. 3 is a side cutaway view that illustrates a preferred embodiment of the present invention. The actuator includes a dual yoke 300 with a yoke slot 302 in each end and a center to which the rotatable shaft 304 is attached. Two pushing shafts 306 are coupled to the two ends of the dual yoke 300 by yoke pins 308 that pass through the yoke slots 302 and through holes in the push rods 306. The ends of the yoke pins 308 extend beyond the yoke slots 302, and are supported by yoke pin slots 310 in the surrounding housing 312.

Two essentially identical piston/spring assemblies 314 are positioned at diagonally symmetric locations on opposite sides of the dual yoke 300, with the two piston/spring assemblies 314 applying essentially equal and balanced forces to the two push rods 306. The diagonally symmetric placement of the piston/spring assemblies 314 is possible because each of the push rods 306 extends in only one direction from the dual yoke 300. If the push rods 306 extended in both directions from the dual yoke 300, the push rods would interfere with the diagonally symmetric placement of the piston/spring assemblies 314.

The diagonal symmetry of the piston/spring assemblies 314, the push rods 306, and the dual yoke 300, ensures that the side loading forces applied to the rotatable shaft 304 by the two push rods 306 will cancel each other, and there will be no net side loading force applied to the rotatable shaft 304.

Figure 4:
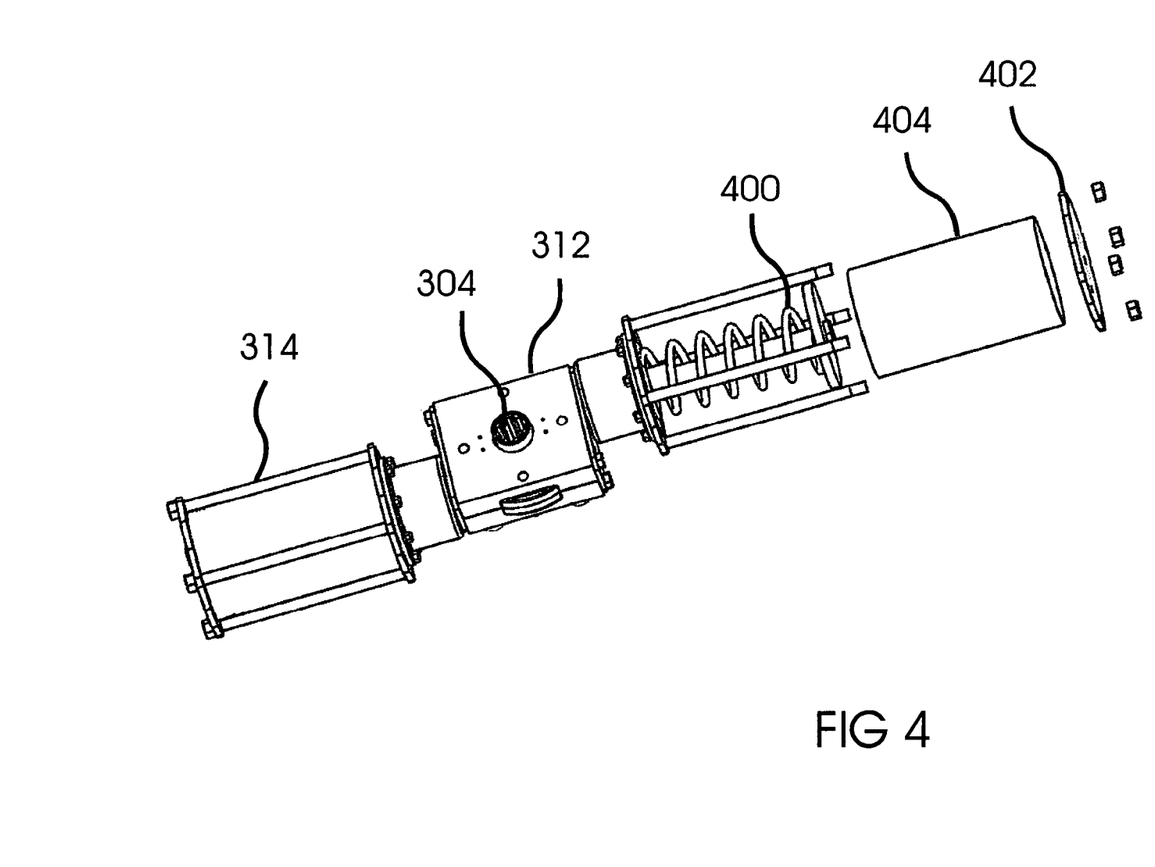
FIG. 4 is a perspective view of the present invention with one piston/spring assembly disassembled.

FIG. 4 is a perspective view of the embodiment illustrated in FIG. 3. The rotatable shaft 304 can be seen projecting from the dual yoke housing 312, and one of the piston/spring assemblies has been partially disassembled. In this embodiment, the piston/spring assemblies 314 include a "captured" spring 400 that is maintained under tension when the end 402 of the assembly 314 and the piston 404 are removed. This facilitates easy maintenance and piston exchange without need to remove the Scotch yoke assembly from the valve or other device to which it is attached. It can also be seen that pressure is applied to the piston from the side furthest from the dual yoke housing 312, thereby eliminating the need for push rod seals to isolate pneumatic fluid from the yoke assembly.

Figure 5:
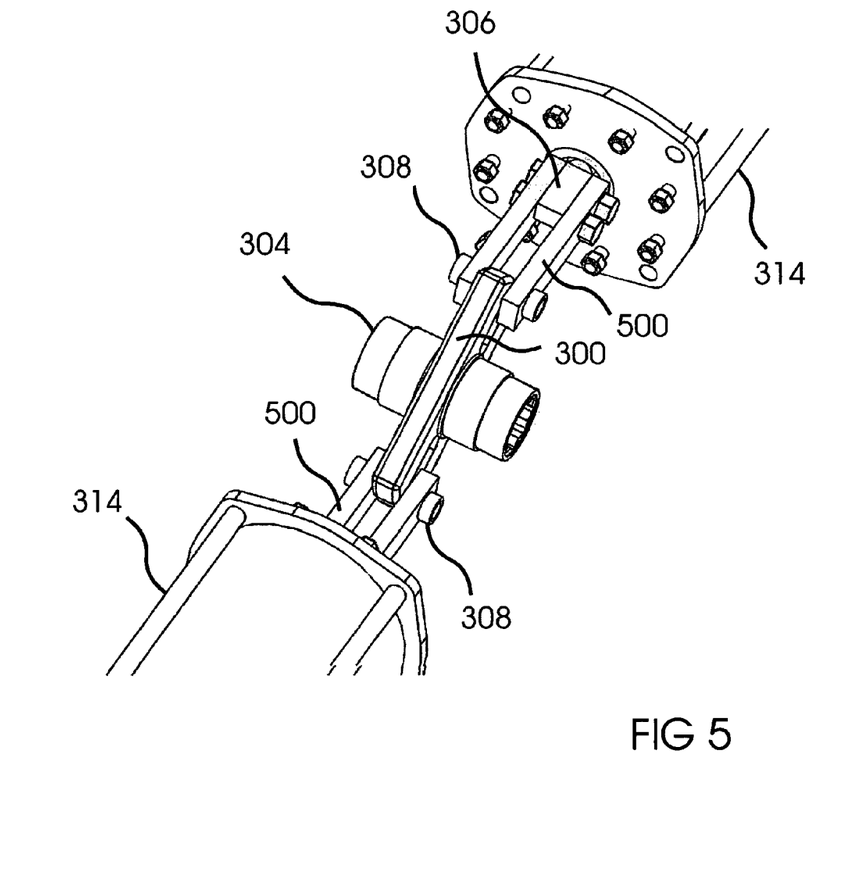
FIG. 5 is a close-up perspective view of the dual yoke and pushing shaft portion of the present invention.

FIG. 5 is a perspective view from another angle of the embodiment of FIG. 3 and FIG. 4. It can be seen in FIG. 5 that the dual yoke 300 is flat, and that the end of each push rod 306 is split into two clevis extensions 500 that are located on either side of a slotted end of the dual yoke 300, so that each yoke pin 308 passes through a slot (302 in FIG. 3) in one end of the dual yoke 300 and through holes in the push rod clevis extensions 500 on either side of the slot (302 in FIG. 3). This arrangement provides improved support of the yoke pins, as compared to traditional designs such as the one shown in FIG. 1B in which the yoke 104 is split and surrounds the push rod 100.

Figure 6:
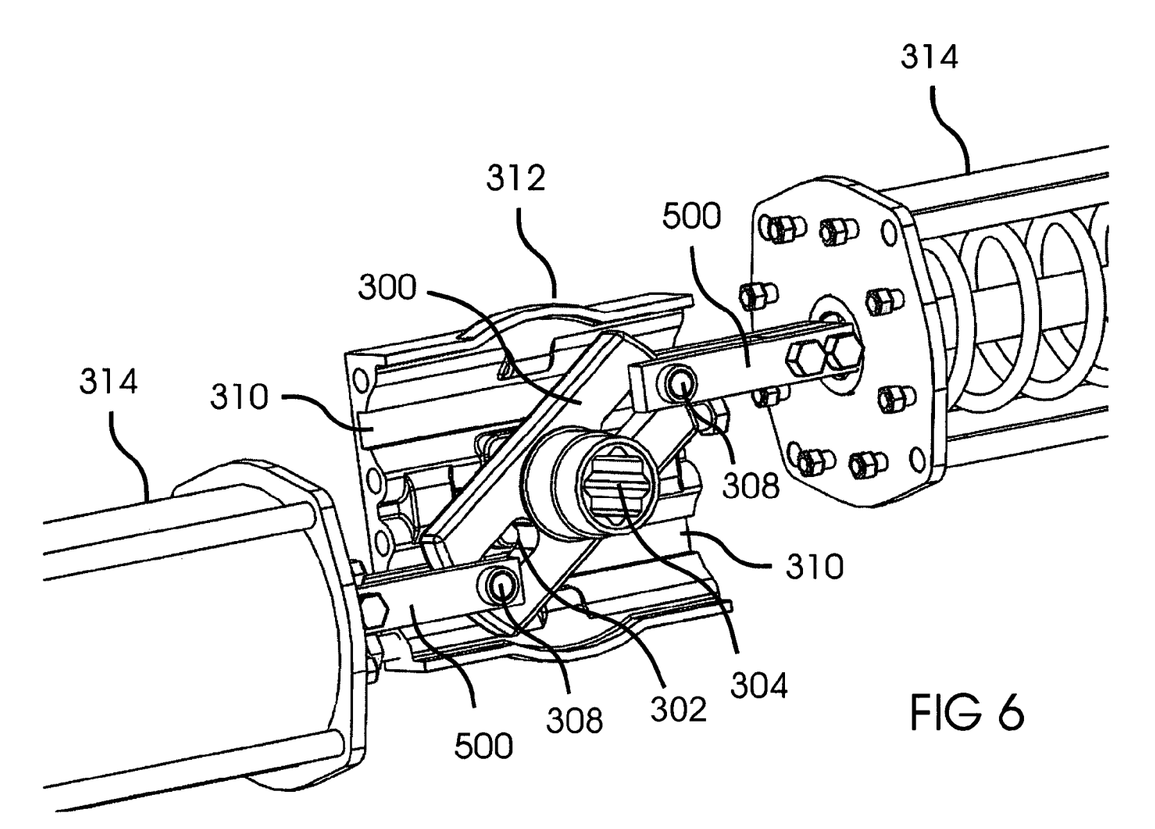
FIG. 6 is a cutaway perspective view of the dual yoke and pushing shaft portion of the present invention.

FIG. 6 is a close-up cutaway perspective view of the yoke assembly of the embodiment of FIG. 3, FIG. 4, and FIG. 5. In this view, it can be clearly seen how the yoke pins 308 extend beyond the clevis extensions 500 of the push rods and are supported by yoke pin slots 310 formed in the dual yoke housing 312. The yoke pin slots 310 in this embodiment extend to the edges of the dual yoke housing face 312 in which they are formed. This allows for easy removal and reinstallation of the push rods 500 and push rod pins 308 without complete disassembly of the dual yoke housing 312 or removal of the yoke 300 from the rotatable shaft 304. The push rods 500 and push rod pins 308 are removed simply by removing the end plates (not shown) of the yoke housing 312 and sliding the push rod clevis extensions 500 and the yoke pins 308 completely out of the yoke pin slots 310 and out of the yoke housing 312.

Figure 7:
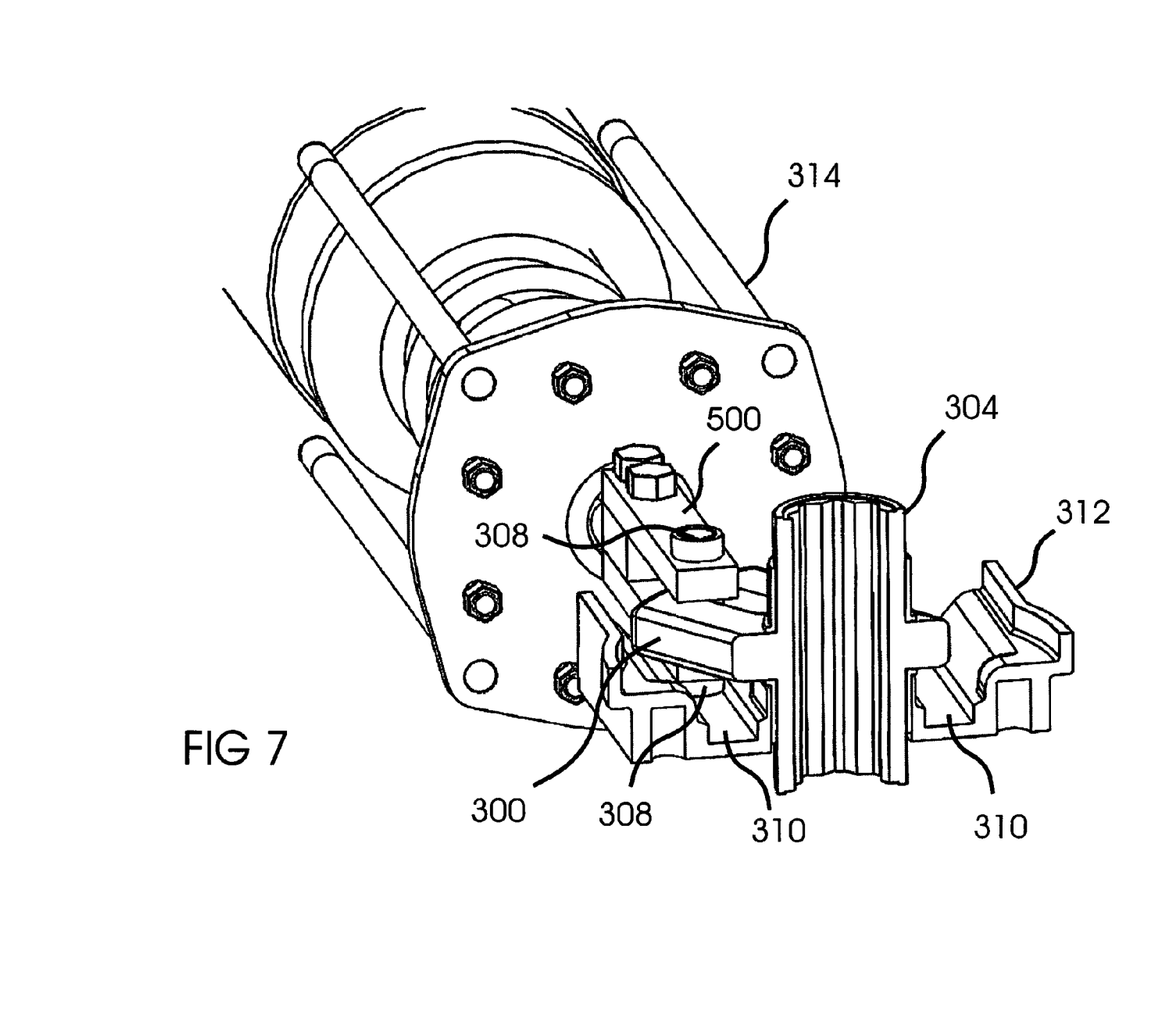
FIG. 7 is a cutaway perspective view of the dual yoke and pushing shaft portion of the present invention from a different angle as compared to FIG. 6.

FIG. 7 is a close-up cutaway perspective view from another angle of the push yoke assembly of the embodiment of FIG. 3, FIG. 4, FIG. 5, and FIG. 6. In FIG. 7 the yoke pins 308 can be seen to extend beyond the push rod extensions 500 and into the yoke pin slots 310 in the yoke housing 312.

Other modifications and implementations will occur to those skilled in the art without departing from the spirit and the scope of the invention as claimed. Accordingly, the above description is not intended to limit the invention except as indicated in the following claims.

What is claimed is:

1. A scotch yoke actuator, comprising:
   a housing having a first end, a second end, a top wall, and a bottom wall, said bottom wall having a first linear guide extending from and through said first end, said top wall having a second linear guide extending from and through said first end, said first and second linear guides being in register and comprising channels formed in the surfaces of said bottom and top walls, respectively;
   a shaft rotatably mounted in said housing;
   a yoke connected to said shaft for rotation therewith, said yoke having a yoke slot, said yoke slot being open on one end;
   a force module removably connected to said first end of said housing, said force module including a rod for reciprocal movement into and out of said housing;
   a yoke pin connected to said rod, said yoke pin having an upper end and a lower end, said lower end having a first guide engagement structure, said upper end having a second guide engagement structure, said yoke pin being received in said yoke slot and said first and second guide engagement structures engaging said first and second linear guides, respectively, when said force module is connected to said housing; and
   said force module, rod, and yoke pin being removable from said housing by removing said first end of said housing and laterally moving said force module, rod, and yoke pin such that said yoke pin slides along said first and second linear guides and out of said housing, while leaving the top and bottom walls of the housing intact and maintaining the connection of said yoke to said shaft.

2. The actuator of claim 1, wherein said force module comprises:
   a generally cylindrical body;
   first and second end plates engaging first and second ends of said cylindrical body;
   a spring disposed in said cylindrical body, said first end plate serving as a spring retainer;
   a piston connected to said rod for urging said spring longitudinally through said cylindrical body; and
   said spring being maintained under tension when said second end plate is disengaged from said cylindrical body and said piston is disconnected from said rod.

3. A scotch yoke actuator, comprising:
   a housing having a first end, a second end, a top wall, and a bottom wall, said bottom wall having a first linear guide extending from and through said first end and a second linear guide extending from and through said second end, said top wall having a third linear guide extending from and through said first end and a fourth linear guide extending from and through said second end, said first and third linear guides being in register, said second and fourth linear guides being in register, said first and second linear guides comprising channels formed in the surface of said bottom wall and said third and fourth linear guides comprising channels being formed in the surface of said top wall;
   a shaft rotatably mounted in said housing;
   a dual yoke connected to said shaft for rotation therewith, said dual yoke having first and second yoke slots, each of said yoke slots being open on one end;
   a first force module removably connected to said first end of said housing, said first module including a first rod for reciprocal movement into and out of said housing;
   a second force module removably connected to said second end of said housing, said second module including a second rod for reciprocal movement into and out of said housing;
   a first yoke pin connected to said first rod, said first yoke pin having an upper end and a lower end, said lower end having a first guide engagement structure, said upper end having a third guide engagement structure, said first yoke pin being received in said first yoke slot and said first and third guide engagement structures engaging said first and third linear guides, respectively, when said first force module is connected to said first end of said housing;
   a second yoke pin connected to said second rod, said second yoke pin having an upper end and a lower end, said lower end having a second guide engagement structure, said upper end having a fourth guide engagement structure, said second yoke pin being received in said second yoke slot and said second and fourth guide engagement structures engaging said second and fourth linear guides, respectively, when said second force module is connected to said second end of said housing; and
   said first and second force modules, first and second rods, and first and second yoke pins being removable from said housing by removing said first and second ends of said housing and laterally moving said first and second force modules, first and second rods, and first and second yoke pins such that said first yoke pin slides along said first and third linear guides out of said housing and said second yoke pin slides along said second and fourth linear guides out of said housing, while leaving the top and bottom walls of the housing intact and maintaining the connection of said dual yoke to said shaft.

4. The actuator of claim 3, wherein said force modules are disposed on diametrically opposite sides of said rotatable shaft.

5. The actuator of claim 3, wherein each force module comprises:
   a generally cylindrical body;
   first and second end plates engaging first and second ends of said cylindrical body;
   a spring disposed in said cylindrical body, said first end plate serving as a spring retainer;
   a piston connected to said rod for urging said spring longitudinally through said cylindrical body;
   said spring being maintained under tension when said second end plate is disengaged from said cylindrical body and said piston is disconnected from said rod.

6. The actuator of claim 3, wherein each rod extends from said dual yoke in only one direction, the first and second rods extending from said dual yoke in opposite directions.

* * * * *